July 15, 1969    C. R. CHUTE    3,455,055
PLANT RECEPTACLE

Filed Dec. 9, 1966    2 Sheets-Sheet 1

INVENTOR.
Challoner R. Chute

BY
Shoemaker and Mattare
ATTORNEYS

July 15, 1969 C. R. CHUTE 3,455,055
PLANT RECEPTACLE
Filed Dec. 9, 1966 2 Sheets-Sheet 2
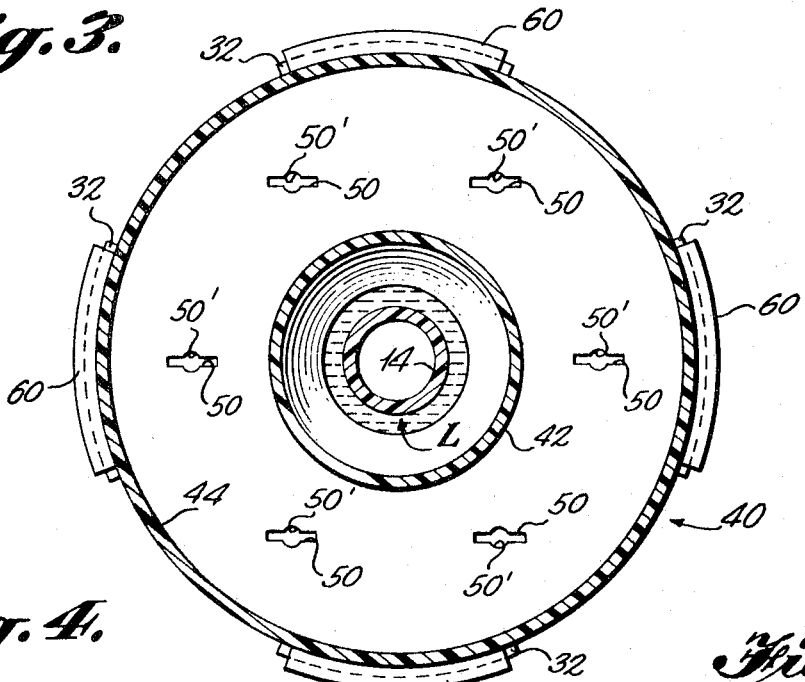
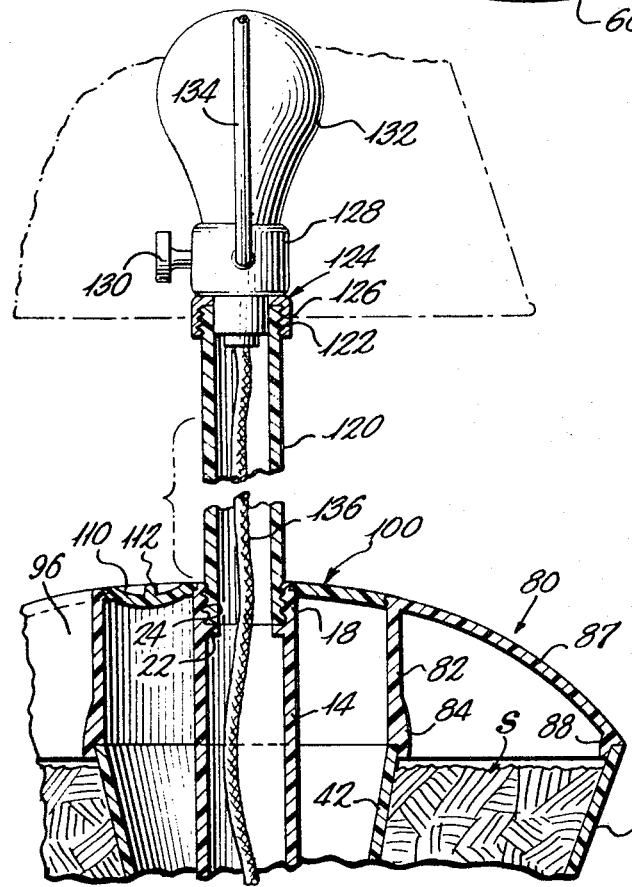
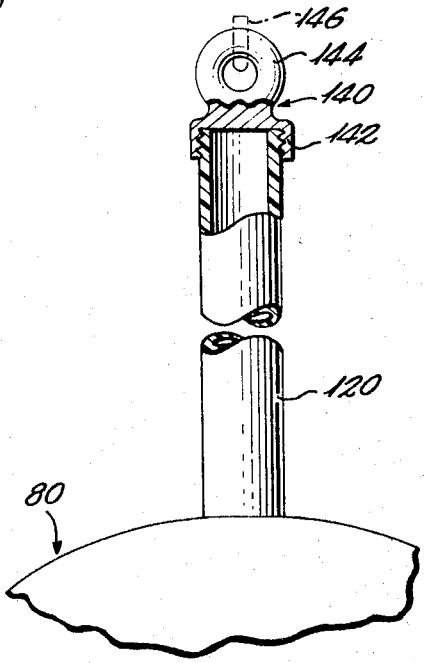
INVENTOR.
Challoner R. Chute
BY
Shoemaker and Mattare
ATTORNEYS United States Patent Office 3,455,055
Patented July 15, 1969

3,455,055
PLANT RECEPTACLE
Challoner R. Chute, 918 Rugby Road,
Charlottesville, Va. 22903
Filed Dec. 9, 1966, Ser. No. 600,552
Int. Cl. A01g 27/00
U.S. Cl. 47—38.1                                  10 Claims

ABSTRACT OF THE DISCLOSURE

A base portion is adapted to receive liquid therein and includes an integral upwardly extending tubular portion open at the upper and lower ends thereof. A plug is threaded into the upper end of the tubular portion to normally close off this upper portion. This plug may be removed for receiving a tubular extension for mounting a light bulb and shade so that the apparatus can be used as a lamp with the electrical cord extending up through such tubular portion. An intermediate portion is selectively locked onto the base portion, this intermediate portion including spaced inner and outer walls and a bottom wall defining an annular space receiving soil within which plant are placed. Wick means extends downwardly through holes in the bottom wall of this intermediate portion for wetting the soil from liquid in the base portion. The lowermost portion of the inner wall of the intermediate portion tapers downwardly and inwardly toward the base portion to prevent liquid from leaking out of the apparatus should it be tipped over. An upper portion is supported on the intermediate portion and includes an inner wall disposed in spaced surrounding relation to the upper end of the integral tubular portion of the base portion. An annular closure means is threaded into the upper portion for normally closing off this annular space between the upper portion and the integral tubular portion. The closure means may be removed so that liquid may pass downwardly through the annular space around the integral tubular portion of the base portion for filling the base portion with liquid.

Background of the invention

The invention relates to a receptacle within which any type of plant is adapted to be planted in the soil supported by the receptacle, and wherein means is provided for continuously wetting the soil so that the plants will be properly nourished. The apparatus is designed so that it may be readily assembled and disassembled for filling the device with water or for replacing components thereof when required.

The present invention represents an improvement over a plant receptacle such as shown in U.S. Patent 3,222,819. This prior art patent also discloses a plant receptacle composed of a plurality of parts which may be readily assembled and disassembled. This type of prior art plant receptacle is designed to be suspended from a suitable hanger mechanism. The structure and aesthetic appearance thereof is such that it can only be feasibly used in its suspended position. The arrangement is such that the apparatus is not sufficiently stable to be supported on its base, and it is of such a construction as to present a good appearance only when hanging from some supporting structure.

A further problem with the arrangement as shown in this U.S. patent is the fact that if the structure should be accidently tipped over, liquid can readily run out of the apparatus through the central tubular filling stem. Additionally, the water level is indicated by a float mechanism since it is not possible to visually inspect the liquid level in the base of the apparatus unless it is completely disassembled. This is disadvantageous since this float mechanism tends to become wedged in the central stem so that it does not accurately indicate the liquid level.

A further disadvantage of the arrangement shown in the aforementioned U.S. patent is the fact that there is a direct air passage through the central stem from the liquid in the base portion to atmosphere. This results in excessive evaporation of liquid from the apparatus so that it must be refilled quite often.

In addition, the plant receptacle as shown in the aforementioned U.S. patent can only be used as a plant receptacle, and does not have any additional possible use as in the present invention.

Summary of the invention

In the present invention, the apparatus includes a construction which permits it to be readily employed more or less as a pot resting on a supporting surface wherein it is not suspended from any overhanging structure. In order to accomplish this, the base portion of the present invention is provided with a substantial flat bottom area, and the configuration of the apparatus is such as to resemble a conventional pot rather than being more or less bottle-shaped as in the aforementioned U.S. patent.

Although the apparatus of the present invention is readily adaptable for use resting on a supporting surface, it may be readily converted for use wherein it is suspended from a suitable hanger means. The base portion of the present invention includes an integral tubular portion which is threaded at the upper end thereof for receiving a hanger fitting. This open upper end of the tubular portion is normally closed off by a plug means so as to prevent the entrance of foreign matter into the tubular portion and to present a pleasing finished appearance to the structure.

The provision of this integral tubular portion also enables the apparatus to be readily converted into a lamp wherein the structure serves as the lamp base, and the electrical cord for the lamp may pass upwardly through the integral tubular portion and through an extension attached thereto so that a very neat appearing and aesthetically pleasing lamp arrangement may be provided.

The intermediate portion of the present invention includes an inner wall having a downwardly and inwardly tapering portion extending towards the base portion so that if the apparatus is accidentally tipped over, this downwardly and inwardly tapering portion will tend to prevent liquid from leaking out of the apparatus. In addition, the filling arrangement is such that when the annular closure means provided between the upper portion and the integral tubular portion of the structure is removed, the liquid level can be visually examined so as to readily determine the liquid level without the necessity of providing a float mechanism. The annular filling opening provided at the upper portion of the structure is also substantially larger than that afforded in an arrangement as shown in the aforementioned U.S. patent so as to facilitate filling of the apparatus.

The closure means also enables the structure to be sealed off so that there is no direct air channel from the body of liquid in the base portion and the surrounding atmosphere to thereby substantially reduce the evaporation occurring under normal operating conditions.

An object of the invention is to provide a new and novel plant receptacle which may be readily employed either when resting on a supporting surface or suspended from an overhanging structure, and further wherein the receptacle may be employed as a lamp base.

Another object of the invention is the provision of a plant receptacle which is substantially waterproof in its upright position and which resists the tendency to leak when accidentally tipped over; and further which provides direct visual inspection of the water level therewithin so as to eliminate the necessity of providing a float mechanism.

Still another object of the invention is to provide a plant receptacle wherein there is no direct air channel to atmosphere thereby substantially reducing the evaporation of liquid from the apparatus.

Brief description of the drawings

FIG. 3 is a sectional view taken substantially along line 3—3 of FIG. 2 looking in the direction of the arrows;

FIG. 4 is a sectional view through the upper portion of the receptacle illustrating the manner in which it may be employed as a lamp base; and FIG. 5 is a view partly in section illustrating the manner in which the apparatus may be suspended from a suitable hanger mechanism.

Description of the preferred embodiments

Figure 1:
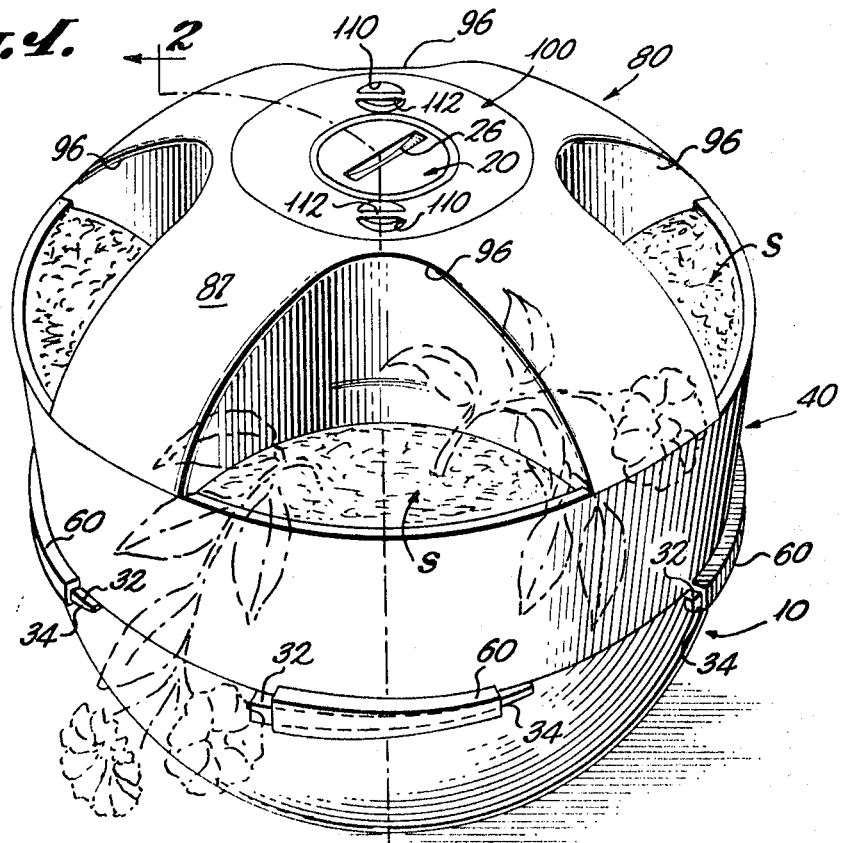
FIG. 1 is a top perspective view of the plant receptacle according to the present invention.

Referring now to the drawings wherein like reference characters designate corresponding parts throughout the several views, the plant receptacle of the present invention includes a base portion indicated generally by reference numeral 10. The base portion includes a bottom wall 12 having a substantial area defining a flat undersurface whereby the base portion is adapted to effectively support the apparatus on an underlying support surface so that it will be stable and will not readily tip over. This base portion includes an integral upwardly extending tubular portion 14 which is open at the lower end 16 thereof and which is also open at the upper end 18 thereof.

The open upper end of the integral tubular portion is normally closed off by a plug 20. A radially inwardly extending annular shoulder 22 is provided on the inner surface of the integral tubular portion, and the inner surface of the tubular portion above this shoulder is internally threaded for receiving threads formed in the outer surface of the plug whereby the plug may be threaded into the operative position illustrated in FIG. 2 wherein the lower surface of the plug rests upon shoulder 22. A kerf 26 is provided in the upper surface of the plug for receiving suitable means for unthreading the plug when desired. It will be noted that the plug is substantially flush with the upper end of the tubular portion 14 in the operative position shown in FIG. 2.

The bottom wall 12 of base portion 10 joins with an arcuate upwardly sloping side wall portion 30, this side wall portion having four equally spaced cam lugs 32 formed integrally therewith and extending outwardly thereof. As seen most clearly in FIG. 1, the undersurface of each of the cam lugs 32 slopes downwardly in a circumferential direction from right to left as seen in FIG. 1 so as to provide a cam undersurface which cooperates with similar cam surfaces formed on the intermediate portion hereinafter described.

Figure 2:
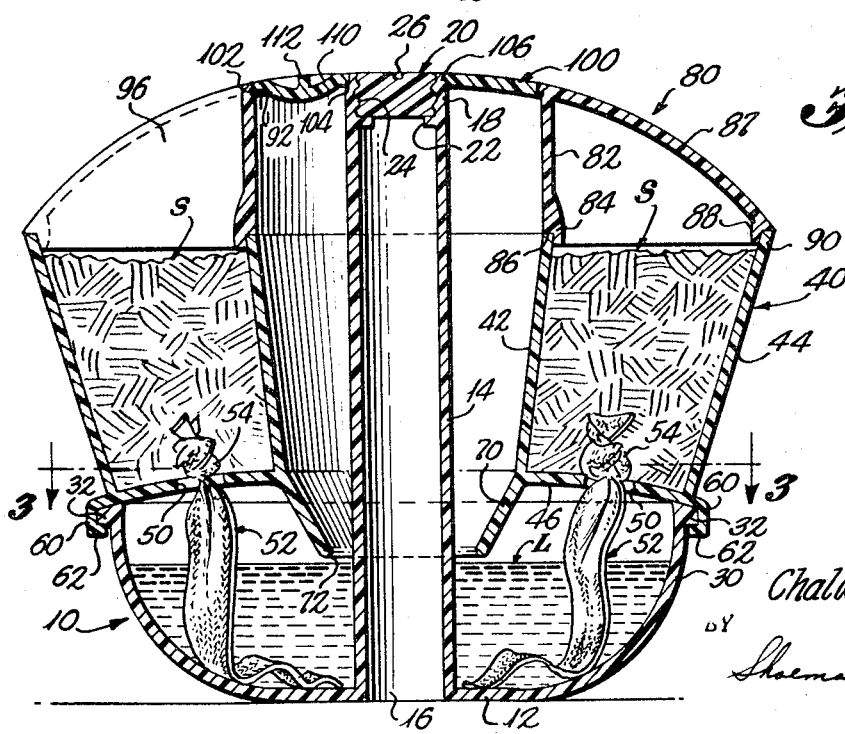
FIG. 2 is a sectional view taken substantially along line 2—2 of FIG. 1 looking in the direction of the arrows.

The various portions of the apparatus of the present invention are formed of a suitable substance such as polypropylene plastic or the like, and as seen in FIG. 2, a body of liquid indicated by reference character L is disposed within the base portion for wetting the soil supported in the intermediate portion hereinafter described.

An intermediate portion indicated generally by reference numeral 40 includes an inner wall 42 disposed in spaced surrounding relationship to the integral tubular portion 14, this inner wall 42 being of generally frustoconical configuration as seen in FIG. 2. An outer wall 44 of the intermediate portion is disposed in spaced surrounding relationship to the inner wall 42 and is generally parallel therewith although it may have a slightly greater slope as seen in FIG. 2. The inner and outer walls 42 and 44 respectively are joined by a bottom wall 46 whereby an annular space is provided for receiving the soil indicated by reference character S within the intermediate portion.

The bottom wall 46 of the intermediate portion is provided with a plurality of spaced holes 50 as seen most clearly in FIG. 3 which are of generally rectangular configuration and include an enlarged generally circular central portion 50'. As seen in FIG. 2, wick means indicated generally by reference numeral 52 is operatively associated with these holes and extends therethrough. This wick means may comprise a suitable porous material such as cloth or the like having the necessary capillary characteristics whereby liquid will be drawn upwardly through the wick material into the soil disposed within the intermediate portion. As illustrated, the upper ends of the wicks may be knotted as indicated at 54 so that they will not drop downwardly into the base portion. Any suitable number of wicks may be employed, and a wick may extend through each or the holes 50 if so desired.

The intermediate portion 40 is provided with four equally spaced outwardly extending lug portions 60 each of which extends downwardly from the intermediate portion and includes an inwardly extending lower portion 62 as seen most clearly in FIG. 2. The upper surface of portion 62 slopes downwardly in a circumferential direction so as to cooperate with the undersurface 34 of the cam lugs provided on the base portion whereby upon relative rotation of the intermediate portion in a clockwise direction with respect to the base portion as seen in the drawings, the intermediate portion will be drawn down tightly on the base portion so as to provide a fluid-tight seal therewith.

The inner wall of the intermediate portion includes a downwardly and inwardly tapering portion 70 terminating in a lower end 72 which is disposed in spaced surrounding relationship to the integral tubular portion 14 to provide an annular filling space through which liquid is adapted to pass downwardly into the base portion. This inner wall portion 70 also provides a safety factor such that if the receptacle should accidentally tip over, this portion 70 will resist the tendency of the liquid within the base portion to leak outwardly thereof.

An upper portion indicated generally by reference numeral 80 includes an inner wall portion 82 disposed in spaced surrounding relationship to the upper end of the tubular portion 14. Wall portion 82 includes a thickened lower portion 84 having an annular cutout portion 86 formed in the inner surface thereof for receiving the upper end of the inner wall 42 of the intermediate portion for accurately positioning the upper portion thereon.

Upper portion 80 also includes an arcuate outer wall portion 87 which provides a substantial dome-shape to the upper surface of the upper portion. The lower end of outer wall portion 87 terminates in a thickened portion 88 having a peripherally extending recess 90 therein for receiving the upper end of the outer wall 44 of the intermediate portion whereby the upper portion is accurately and positively held in place. The upper port of the inner surface of inner wall 82 of the upper portion is provided with threads 92 thereon for a purpose hereinafter described.

As seen most clearly in FIG. 1, the outer wall 97 of the upper portion 80 defines a plurality of spaced recesses or pockets 96 shown as being four in number. It is apparent that any suitable number of recesses may be provided as desired. The areas defined by recesses 96 are adapted to receive plants which are supported within the soil disposed within the intermediate portion. It is evident that these recesses provide access to the soil in the intermediate portion from the exterior of the apparatus when the upper portion is in the operative position shown. It is evident that the upper portion may be simply lifted off of the operative position illustrated if so desired. The dimensions of the upper portion and intermediate portion may be such that the upper portion is adapted to be snugly fitted within the intermediate portion so as to be retained in operative position by the friction between the parts, and yet at the same time be readily manually removable.

A closure means indicated generally by reference numeral 100 comprises an annular member adapted to close off the annular space between the inner wall 82 of the upper portion and the upper end of the integral tubular portion 14. The outer periphery of closure means 100 is provided with threads 102 whereby the closure means is adapted to be threaded into the threads 92 provided in the inner wall of the upper portion.

The central hole provided in annular closure means 100 is undercut as indicated by reference numeral 104 to provide a peripheral undercut portion adapted to rest upon the annular shoulder 106 provided at the upper end of the integral tubular portion 14 whereby the closure means is adapted to be supported at the inner surface thereof on the tubular portion, this interengagement limiting downward movement of the closure means.

A pair of diametrically opposite depressions 110 are provided in the upper surface of closure means 100, integral rib portions 112 extending across the central portions of these recesses whereby a person's fingers may be placed in the depressions 110 to engage rib portions 112 for selectively moving the closure means into and out of the operative position illustrated in the drawings.

When using the apparatus as illustrated in FIGS. 1 and 2, the closure means 100 may be selectively unscrewed so as to visually inspect the liquid level in the base portion 10, and if additional liquid is required, liquid may be poured into the annular space surrounding integral tubular portion 14 whereby it will flow downwardly into the base portion.

The wick means will serve to keep the soil moist, and it is merely necessary to periodically refill the apparatus with liquid so that it will provide the desired results.

It will be noted that as seen in FIGS. 1 and 2, when the plug 20 in the closure means 100 is in the operative position shown, the upper surfaces thereof are substantially flush with the surrounding upper surface of the wall portion 87 of the upper portion 80 so that a smooth upper surface for the entire apparatus is afforded. It will also be noted that a very pleasant external appearance is provided, and that the apparatus resembles a conventional flower pot.

Referring now to FIG. 4 of the drawings, a modified arrangement according to the present invention is illustrated. As seen in this figure, the plug has been removed from the upper end of the integral tubular portion 14, and an elongated tubular member 120 has been substituted therefor. The lower end of member 120 is externally threaded so as to be received within the threads 24 provided in the upper end of tubular portion 14.

The upper end of tubular portion 120 is provided with external threads 122. A fitting 124 is provided with a downwardly extending annular flange 126 which is internally threaded so as to be threaded on the upper end of tubular portion 120. Fitting 124 includes a lamp socket portion 128 supporting a conventional switch 130 and having an electric light bulb 132 supported therewithin. Socket 128 also serves to support member 134 which in turn has a conventional lamp shade suspended therefrom in the usual manner.

The electric cord for the electric light assembly of the lamp is indicated by reference numeral 136, this cord extending upwardly through the hollow interior of the integral tubular portion 14 and the tubular member 120. This is a very desirable arrangement since the electric cord will be hidden from view and a very neat and attractive finished appearance will be provided when the apparatus is employed in this manner as a lamp base. It will of course be understood that plants may be supported within the receptacle when used in this manner.

Referring now to FIG. 5, a further arrangement according to the present invention is illustrated wherein the plant receptacle is adapted to be suspended from a suitable hanger structure. The tubular member 120 is again employed as in the arrangement shown in FIG. 4. Instead of the fitting 124, a fitting indicated generally by reference numeral 140 is provided. Fitting 140 includes an integral downwardly extending annular flange 142 having internal threads formed therein for threading on the upper end of tubular member 120.

Fitting 140 also includes an eye portion 144 adapted to receive a suitable hanger means 146 whereby the entire apparatus is adapted to be supported in suspended relationship.

It is apparent from the foregoing that there is provided according to the present invention a new and novel plant receptacle which may be readily employed either when resting on a flat surface or suspended from a suitable hanger structure, and wherein the receptacle is readily adapted for use as a lamp base. The apparatus is substantially waterproof and resists tendency to leak even when accidentally tipped over. Means is provided for providing visual inspection of the water level in the apparatus and eliminates the necessity of providing a float or the like. No direct air channel is provided from the body of liquid in the apparatus to atmosphere thereby substantially reducing evaporation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A plant receptacle comprising a base portion for receiving liquid, said base portion having a bottom for supporting said receptacle, said base portion including an integral tubular portion extending upwardly therefrom, said tubular portion being open at the upper end thereof and the lower end thereof opening through said bottom, said receptacle including an intermediate portion supported by said base portion, said intermediate portion including inner and outer spaced walls and a bottom wall defining an annular space for receiving soil, means for wetting soil in said annular space with liquid from said base portion, said receptacle including an upper portion supported by said intermediate portion, said upper portion defining areas for receiving plants.

2. Apparatus as defined in claim 1 including plug means for closing off the upper end of said integral tubular portion.

3. Apparatus as defined in claim 2 wherein said integral tubular portion is internally threaded at the upper end thereof, said plug means having cooperating threads formed thereon whereby the plug means is adapted to be threaded into the upper end of said integral tubular portion.

4. Apparatus as defined in claim 1 wherein said intermediate portion includes an integral downwardly and inwardly tapering portion extending toward said base portion and being in surrounding spaced relationship to said integral tubular portion to define an annular filling space through which liquid may pass downwardly into said base portion.

5. Apparatus as defined in claim 1 wherein said wetting means includes porous wick means extending into said annular space defined by said intermediate portion, said bottom wall of the intermediate portion having hole means therein, said wick means extending downwardly through said hole means and into said base portion so as to be disposed within liquid supported within the base portion.

6. Apparatus as defined in claim 1 wherein said upper portion includes an inner wall disposed in surrounding spaced relation to the upper end of said integral tubular portion of the base portion, and closure means of annular configuration closing off the space between the inner wall of said upper portion and said integral tubular portion.

7. Apparatus as defined in claim 6 wherein said inner wall of the upper portion includes threads formed at the upper part thereof, said closure means having threads formed on the outer periphery thereof whereby the closure means is threaded into operative position.

8. Apparatus as defined in claim 1 wherein the inner wall of said intermediate portion is disposed in spaced surrounding relationship to said integral tubular portion and includes an integral downwardly and inwardly tapering portion extending toward said base portion, the lower end of said downwardly and inwardly tapering portion being disposed in spaced surrounding relationship to said integral tubular portion to define an annular filling space through which liquid can pass downwardly into said base portion, said upper portion including an inner wall disposed in spaced surrounding relationship to the upper end of said integral tubular portion so that liquid can be poured downwardly through the annular space between said integral tubular portion and the inner walls of said upper portion and said intermediate portion, and closure means for normally closing off the annular space between the inner wall of said upper portion and said integral tubular portion.

9. Apparatus as defined in claim 8 including plug means for closing off the upper end of said integral tubular portion.

10. Apparatus as defined in claim 9 wherein said wetting means comprises porous wick means, said bottom wall of the intermediate portion having hole means formed therethrough, said wick means extending through said hole means with the upper end of said wick means being disposed within the annular space between the inner and outer spaced walls of said intermediate portion, and the lower end of said wick means extending downwardly within said base portion so as to be disposed within liquid in said base portion.

References Cited
UNITED STATES PATENTS

| | | | |
|---|---|---|---|
| 1,297,254 | 3/1919 | Sato. | |
| 2,720,056 | 10/1955 | Levy | 47—34 |
| 2,738,621 | 3/1956 | Abbrecht | 47—38 |
| 2,837,866 | 6/1958 | Esmay et al. | 47—34.12 |
| 3,058,263 | 10/1962 | Reynolds | 47—38.1 |
| 3,222,819 | 12/1965 | Marcan | 47—38.1 |

FOREIGN PATENTS

| | | |
|---|---|---|
| 1,446,275 | 6/1966 | France. |

ROBERT E. BAGWILL, Primary Examiner